March 21, 1950 — K. R. LARSON — 2,501,471
DEVICE FOR ATTACHING FLOATS TO FISHLINES
Filed Nov. 17, 1945
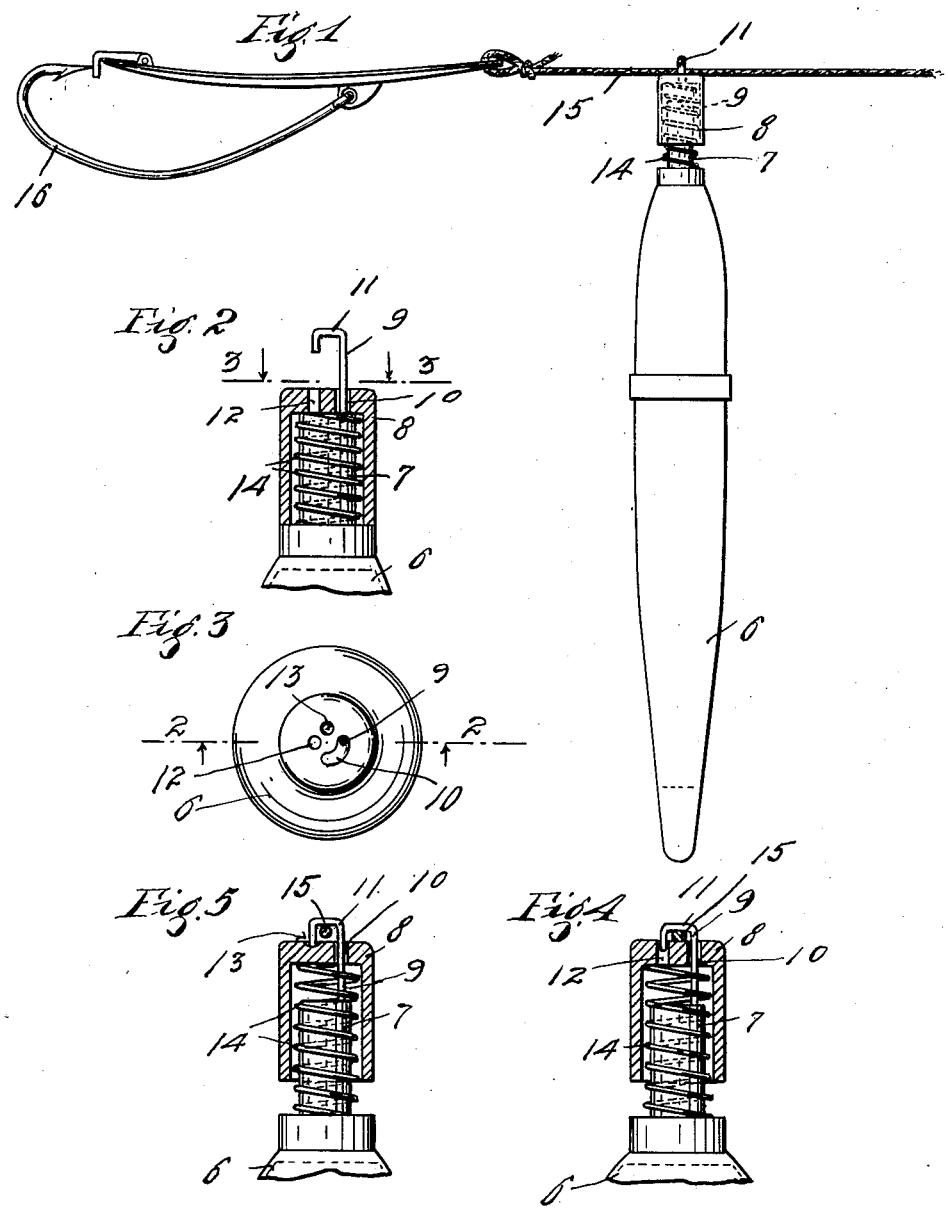
INVENTOR
Karl R. Larson
BY Harry D. Kilgore
ATTORNEY Patented Mar. 21, 1950

2,501,471

UNITED STATES PATENT OFFICE 2,501,471

DEVICE FOR ATTACHING FLOATS TO FISHLINES

Karl R. Larson, Minneapolis, Minn., assignor to The Paul Bunyan Bait Company, Minneapolis, Minn., a corporation of Minnesota Application November 17, 1945, Serial No. 629,303

3 Claims. (Cl. 43—44.87)

My present invention relates to improvements in devices for attaching floats to fishlines.

The object of this invention is to provide attaching means for positively holding a float on a fishline any desired distance from an attached hook or for loosely holding the float where, in casting, the float may be placed close to the hook and when the hook and float strike the water, the fishline will freely run through the attaching means as the hook sinks and the float remains on the surface of the water.

To the above end, the invention consists of the novel devices and combination of devices hereinafter described and defined in the claims.

In the accompanying drawing, which illustrates the invention, like characters indicate like parts throughout the several views.

Referring to the drawing:

Fig. 1 is an elevational view showing a float attached to a hook-equipped fishline;

Fig. 2 is a fragmentary detail view partly in elevation and partly in section taken on the line 2—2 of Fig. 3, showing the cap depressed, with the hook in a fishline-receiving position;

Fig. 3 is a top view with the stem of the fishline-holding hook sectioned on the line 3—3 of Fig. 2;

Fig. 4 is a view corresponding to Fig. 2, with the exception that the cap is raised and the fishline pinched between the cap and the hook; and Fig. 5 is a view similar to Fig. 4, with the exception that the cap has been turned, relative to the float, to position the point of the hook in a depression in the top of the cap and prevent the fishline from being pinched between the cap the hook.

The numeral 6 indicates a hollow float of plastic or other suitable material. On the upper end of the float 6 is a round post 7. A cap 8 is loosely and turnably fitted over the post 7. An upright stem 9 is secured in the top of the post 7 eccentric to the axis thereof. This stem 9 extends through a circumferential slot 10 in the top of the cap 8. The upper end portion of the stem 9 is first bent horizontally over the projected axis of the cap 8 and then vertically downwardly to form a fishline-holding hook 11.

In the top of the cap 8 is a hole 12 and a circumferentially spaced depression 13. The hole 12 and the depression 13 are diametrically opposite the slot 10. A coiled spring 14, encircling the post 7, is compressed between the float 6 and the top of the cap 8. This spring 14 is under strain to lift the cap 8 and project the end portion of the hook 11 into the hole 12 or into the depression 13 and onto the top of the cap 8, depending on the turned position of said cap.

To attach the float 6 to a fishline 15, to which is attached a weedless hook 16, disclosed and broadly claimed in my co-pending application executed of even date herewith and filed November 17, 1945, under Serial Number 629,304 and issued as Patent No. 2,477,488 on July 26, 1949, the cap 8 is depressed, as shown in Fig. 2, to permit said line to be placed in the hook 11. In "still" fishing, the float 6 is positioned on the fishline 15, a distance from the hook 16 that represents the depth in the water the hook 11 is to be held suspended by the float 6 and said float positively held where positioned on said line by being pinched between the cap 8 and the hook 11, as shown in Fig. 4.

In casting, the cap 8 is turned to position the end of the hook 11 in the depression 13 to hold said cap against the action of the spring 14 and away from the fishline 15 so that said fishline is free to run through the hook 11, as shown in Fig. 5. As long as the end portion of the hook 11 is in either the hole 12 or the depression 13, the cap 8 closes the hook 11 and the float 6 cannot become detached from the fishline 15.

From the above description, it is evident that the float 6 can be very easily and quickly attached to the fishline 15 or removed therefrom. It is also evident that the float 6 can be readily adjusted longitudinally on the fishline 15 simply by depressing the cap 8 relative to the post 7 to release the fishline 15 from the pinching action of the cap 8 and the hook 11 and then sliding said hook on the fishline 15.

What I claim is:

1. A float having a post, a cap loosely and turnably fitted over the post, a hook overlying the cap and having a stem extending through a slot in the top of the cap and secured to the post, and a spring encircling the post and compressed between the float and the cap, said cap having in its top a hole for the end portion of the hook, said spring being under strain to hold the cap lifted, with the end portion of the hook in said hole, and to press a fishline, extending through the hook, against the hook, said cap, when pulled downwardly, having the effect of withdrawing the end portion of the hook from said hole, and when turned relative to the post and released, being adapted to be positioned by the spring against the end of the hook.

2. A float having a post, a cap loosely and turnably fitted over the post, a hook overlying the cap and having a stem extending through a slot in the top of the cap and secured to the post, and a spring encircling the post and compressed between the float and the cap, said cap having in its top a hole for the end portion of the hook, said spring being under strain to hold the cap lifted, with the end portion of the hook in said hole, and to press a fishline, extending through the hook, against the hook, said cap having in its top a depression circumferentially spaced from the hole for the end of the hook when resting on the cap.

3. A float having a post, a cap fitted over the post for relative compound turning and axial movements, a hook overlying the cap and having a stem extending through an aperture in the top of the cap and secured to the post, and a spring encircling the post and compressed between the float and the cap, said cap having in its top a hole for the end portion of the hook, said spring being under strain to hold the cap lifted, with the end portion of the hook in said hole, and to press a fishline, extending through the hook, against the hook, said cap, when pulled downwardly, having the effect of withdrawing the end portion of the hook from the hole, and when turned relative to the post and released, being adapted to be positioned by the spring against the end of the hook and thus release the fishline, whereby the float is free to move bodily on the fishline.

KARL R. LARSON.

REFERENCES CITED

The following references are of record in the file of this patent:

UNITED STATES PATENTS

| Number | Name | Date |
| --- | --- | --- |
| 514,034 | Redfield | Feb. 6, 1894 |
| 2,231,270 | Huston | Feb. 11, 1941 |